(No Model.)

J. R. DAVIS.
SWINGING GATE.

No. 461,999. Patented Oct. 27, 1891.

Witnesses.
A. Ruppert
H. A. Daniels

Inventor:
John R. Davis
Per
Thomas P. Simpson
Atty.

UNITED STATES PATENT OFFICE.

JOHN R. DAVIS, OF BLUFORD, ILLINOIS.

SWINGING GATE.

SPECIFICATION forming part of Letters Patent No. 461,999, dated October 27, 1891.

Application filed April 25, 1891. Serial No. 390,434. (No model.)

*To all whom it may concern:*

Be it known that I, JOHN R. DAVIS, a citizen of the United States, residing at Bluford, in the county of Jefferson and State of Illinois, have invented certain new and useful Improvements in Swinging Gates; and I do hereby declare the following to be a full, clear, and exact description of the invention, such as will enable others skilled in the art to which it appertains to make and use the same.

The special object of the invention is to make a swinging gate, so that it may be conveniently raised such a distance above the ground as will allow hogs to pass under or above the snow which may be on the ground and may prevent the ready opening of the gate.

Figure 1:
Figure 2:
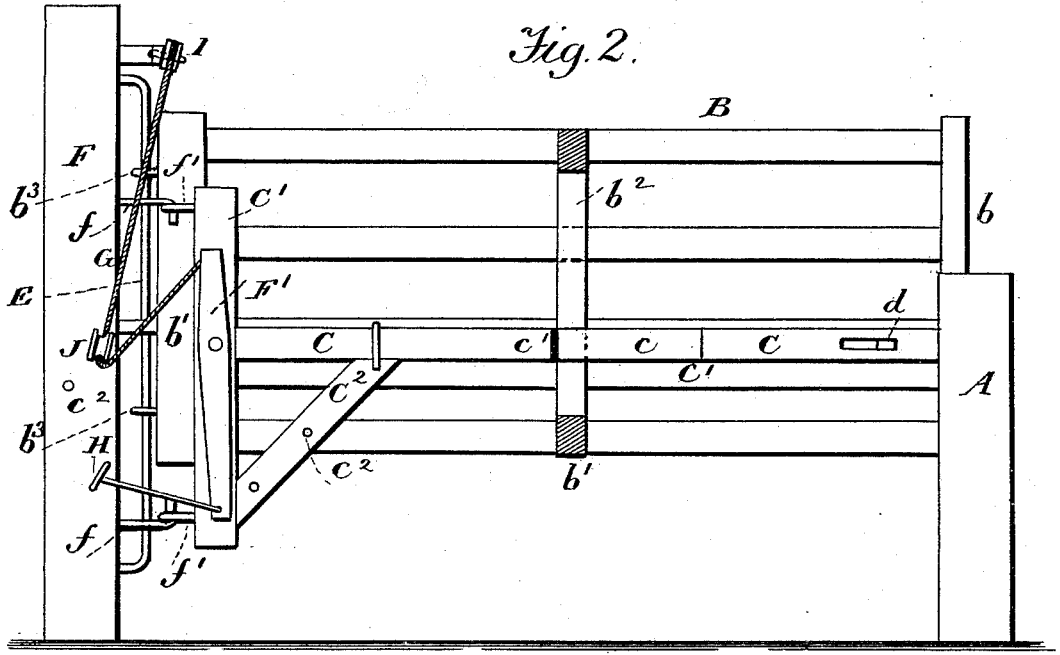

Figure 1 of the drawings is a plan view, partly in section; and Fig. 2, a side elevation partly in section.

In the drawings, A represents the latch-post, which has the right-angled rabbet $a$ to receive the front stile $b$ of the gate B and also the groove $a'$, in which fits the spring-actuated latch D in the front end of the bar $c$, this latch being thrown back, as required, by the stud $d$.

$a^2$ is an angular projection in the rabbet $a$, against whose inclined sides the spring-latch D slides in and out of the groove $a'$. A horizontal bar C is attached to a vertical post C' and braced by a bar $C^2$ to form a supporting-frame for the gate. Eyes $f'\ f'$ on post C' work on the pintles $ff$ of the rear gate-post, said pintles being made to point toward each other, so that the frames C C' $C^2$ cannot move up or down, but only swing around in a horizontal plane.

The gate B has the middle stile $b'$ made with a vertical slot $b^2$, through which passes the part $c$ of the bar, so as to bring the stile $b'$ between the shoulders $c'\ c'$. At the rear end of the gate are placed the hinge-eyes $b^3\ b^3$, to slide up and down on the end-closed pintle E of the post F.

F' is a hand-lever fulcrumed on the post C' and connected by a cord G, passing over the pulleys I J on the post F with the stile $b'$ of the gate. By bearing down on the free end of the lever F' the gate may be raised to any preferred height above the ground, as shown in Fig. 2 of the drawings, and there held by the stay-pin H, placed in one of the brace-holes $c^2$. The gate is retained rigidly in position at any desired altitude by the immobility of the frames C C' $C^2$, to which it is attached.

My horizontally-swinging but vertically-unadjustable frame is so connected by its lever and the rope and post pulleys with the vertically-adjustable gate that the latter rises as it opens, so as to come up above snow or mud or other obstructions. This is one practical advantage of my frame C C' $C^2$. Another great advantage is that it supports the gate midway when it is down and prevents it from sagging.

What I claim as new, and desire to protect by Letters Patent, is—

The combination of a swinging gate sliding vertically upon its hinges, a supporting-frame swinging but not sliding vertically upon hinges on the same gate-post and passing through a slot in the middle stile of the gate, a lever pivoted to the rear of the supporting-frame, and a rope connecting one end of the lever with the gate and passing over two pulleys on the rear gate-post, all substantially as shown, and for the purpose described.

In testimony whereof I affix my signature in presence of two witnesses.

JOHN R. DAVIS.

Witnesses:
 MATTIE SATTERFIELD,
 D. H. WELLS.